Patented Nov. 27, 1934

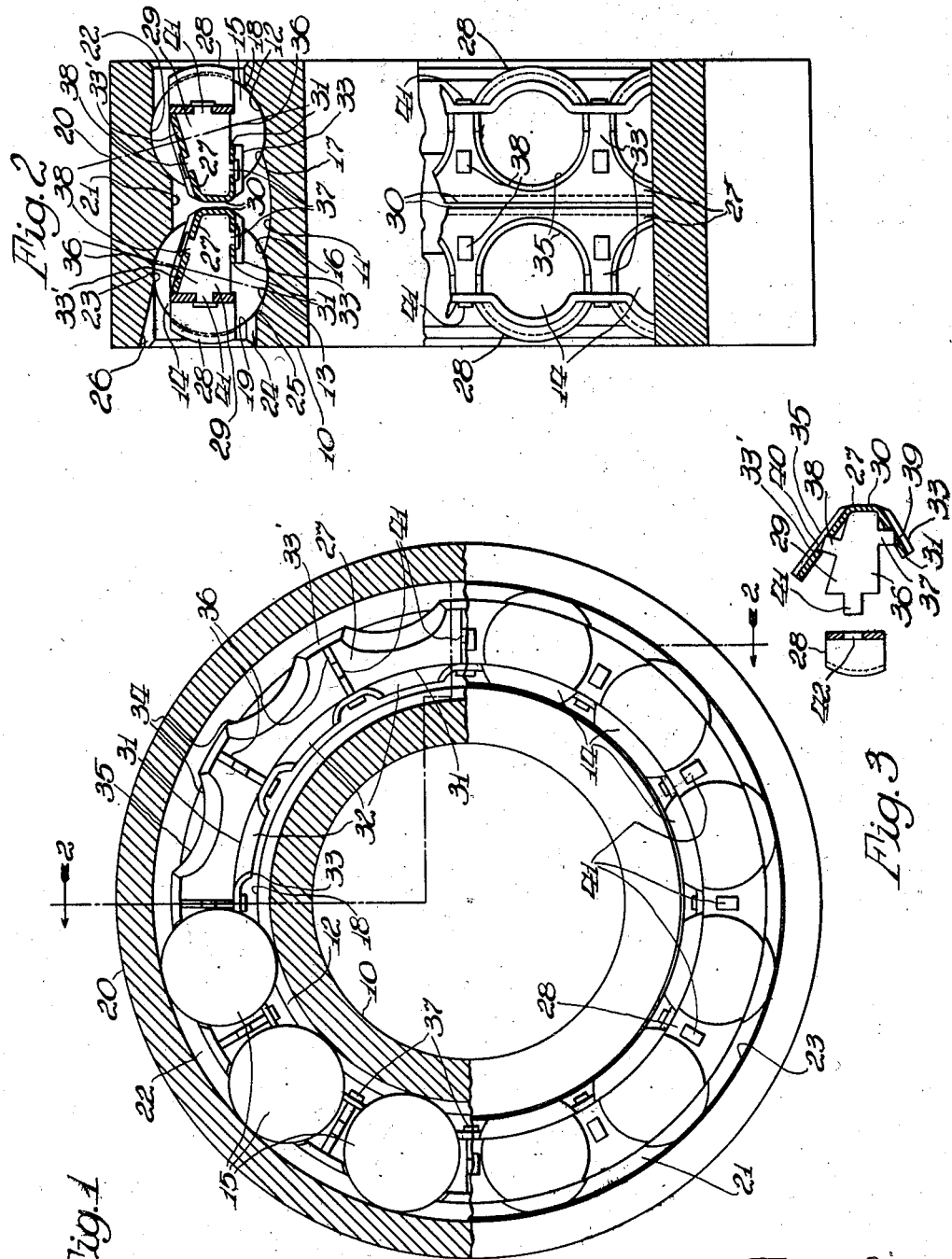

1,982,450

UNITED STATES PATENT OFFICE 1,982,450

BALL BEARING

Harry N. Parsons, Chicago, Ill., assignor to International Harvester Company, a corporation of New Jersey Application May 24, 1933, Serial No. 672,624

2 Claims. (Cl. 308—201)

This invention relates to anti-friction bearings. More particularly it relates to a cage or separator for the balls of a double row bearing.

An object of the invention is to provide an improved ball cage particularly adapted for use in a double row bearing or in an angular contact ball bearing.

Another object is to provide a sheet metal cage which is light and strong and capable of easy assembly with a row of balls by introduction of the portions of the cage from one end of a double row bearing after one row of balls has already been positioned between the races.

Another object is to provide an improved cage or retainer which is capable of having its sections fastened together without distortion and which is rigid and substantial when assembled.

The above objects are obtained by the construction of cages or separators as illustrated in the drawing, in which:

Figure 1 is an elevation of a double row bearing, looking parallel to the axis, one quarter of the races being broken away in section with the outer portion of the cage removed, to show the balls in position, and another quarter being similarly shown with the balls removed.

Figure 2 is a section taken on the line 2—2 of Figure 1. The upper portion of said figure is a radial cross section. The intermediate portion is an elevation showing the cages or retainers with the balls in position.

Figure 3 is a cross section showing the two portions of the cage or separator and the securing elements which are utilized for fastening said members together, said elements being shown before assembly.

As illustrated, the inner race ring 10 is provided with a central annular groove 11 and grooves 12 and 13 at the sides of said groove and between the groove and the sides of the race. The grooves 12 and 13 are ground raceways for the rows of balls 14 and 15. Annular ribs or ridges 16 and 17 are formed where the raceways 12 and 13 intersect the groove 11. The raceway 12 terminates in a ridge or shoulder 18 where it intersects with the outer cylindrical portion or land of the race ring 10. The raceway 13 intersects the outer cylindrical portion or land of the race ring 10, forming a ridge or shoulder 19.

The outer race ring 20 has a central rib 21 projecting down between the two rows of balls 14 and 15. At the sides of said ridge grooved portions 22 and 23 form raceways cooperating with the raceways 12 and 13.

One end of the race ring 10 has a circular slot 24 cut through the portion which forms the outer shoulder to intersect the raceway 13 at the point or rib or ridge 25. It will be noted that this rib or ridge is spaced outwardly from the contact point of the row of balls 14 with the raceway 13.

A complementary filling slot 26 is cut in one end of the outer race ring 20, intersecting the raceway 23 at a point outwardly beyond the point of contact of the balls with the raceway. The line of contact on both races is indicated by the angularly positioned lines extending through the centers of the balls. The filling slots 24 and 26 provide means for filling in the row of the balls 14 after the other row has previously been inserted and assembled into position with respect to the two race rings.

As disclosed in the U. S. patent to Hughes, #1,794,772, March 3, 1931, the two rows of balls may be assembled in the races by first placing the row of balls 15 in the groove 11, applying a cage while the outer race ring 20 is removed, then moving the inner race ring with the balls contained in a cage axially into the outer race ring, the balls 15 passing into the end of the race 20 and engaging the raceway 22. The row of balls are forced over the ridge 17 by a snap action into the raceway 12. This snap assembly holds the parts of the bearing together for further handling, and by having the raceways 12 and 22 extended in each direction beyond a vertical line extending through the center of the balls said balls are supported on both sides. The assembly of the other row of balls will be explained after the description of the particular cage or separator which forms the subject matter of this invention.

The two rows of balls are shown as having similar cages though this is not necessary. In a double row bearing of the general character indicated it is apparent that completed cages or retainers cannot be applied to both rows of balls before the balls are inserted between the races. This follows because the balls 14 in the second row must be inserted one by one. It is also apparent that this type of bearing puts many limitations on the type of cage which can be used, especially as regards the cage for the second and last row of balls. A cage or retainer, as distinguished from a mere separator, is desired because it prevents the balls from working out of the filling slots. Such a cage or retainer must be closed over the balls which its sections fasten together. In a double row bearing the inner side of the second race is practically inaccessible for fastening operations. It is to provide a rigid cage which can be fastened from the outside by backing against the cage of the first row, that is, that the design as illustrated has been made.

As the two cages are similar, one only will be described. Each cage comprises two sections or rings 27 and 28 and securing elements 29. The section 27 has an annular flat back or base portion 30, lying in a plane perpendicular to the axis of the raceways. An inner flange 31 extends in its assembled position at right angles from the inside of the base portion 30. Cupped-out portions 32 surrounded by a bent-down flange 33, are formed in said flange to surround the inner portions of the balls.

A second flange 33' extends outwardly from the outer portion of the base portion 30 at a slight angle thereto, said portion being formed with a plurality of circular notches 34 surrounded by outturned flanges 35 shaped to fit around the outer portions of the balls.

The securing elements 36 are tapered at one end to fit between the flanges 31 and 33. Said elements, as illustrated, are provided with inwardly extending nibs 37 and outwardly extending nibs 38 which are formed to be fitted, respectively, into openings 39 and 40 formed in the flanges 31 and 33. The securing elements extend outwardly between the adjacent balls and are adapted to be secured in position, as shown in Figure 3. Section 27 is first formed with the flanges out of their normal assembled position. The securing members are then inserted and the flanges are bent into the final position, as shown in Figure 2. After the securing members are riveted into position, they are rigid with respect to the section 27 and may be considered as a part of said section. The securing elements may be welded or otherwise secured to the flanges 31 and 33. Laterally extending prongs 41 formed on the securing elements 36, are adapted to fit through openings 42 formed in the flattened portions of the section 28 which lie between the cupped portions surrounding the balls.

As previously described, the row of balls 15 are assembled in the annular groove 11, a cage as described being used. The section 27 is placed over the balls, the section 28 is fitted at the outer sides of the balls, and the prongs 41 are riveted into position. This construction gives a rigid cage or separator which is not deformed during riveting operation and which is of adequate strength to withstand the action of the balls without distortion. The row of balls with its cage is then slipped into position, as previously described. A second section 27 with the securing elements mounted therein, is then inserted between the two races from the open side. The balls 14 are then inserted through the filling opening formed by the slots 24 and 26. A section 28 is then placed over the outer side of the balls with the openings 42 registering with the prongs 41.

It will be noted that, as illustrated in Figure 2, the back portions 30 of the two separator sections 27 are a slight distance apart. This construction is desirable to prevent friction at this point when one cage revolves relative to the other. However, in actual construction the backs of these cage sections are sufficiently close together so that by backing an anvil member against the outer face of the first cage, the back of the later inserted cage section 27 will rest against the back of the first mentioned cage. This construction provides means for riveting the prongs 41 on the second cage securely in position. By turning the two cages into position with the securing elements 36 in line in an axial direction, a secure backing means is obtained for riveting the prongs 41 on the cage to be last assembled. By such a method of assembly a rigid fastening of the parts of the second cage is assured.

It is to be understood that applicant has shown and described a preferred embodiment of his improved cage for double row ball bearings and that he claims as his invention all modifications falling within the scope of the appended claims.

What is claimed is:

1. A retainer for ball bearings comprising an annular member channel-shaped in its radial cross section with the open side of the channel on one axial face and with one of its side walls diverging outwardly from the other, wedge-shaped securing elements extending into said channel and abutting the side walls and the base portion of the annular member, said elements being secured to the side walls of said member and being formed with axially directed extensions, and a second retainer member secured to said extensions, said member and said channel-shaped member being formed to provide pockets for retaining the balls in position.

2. A ball bearing assembly comprising an inner race, an outer race, two rows of balls mounted between said races, and a retainer structure for each row of balls, each of said structures comprising an annular member channel-shaped in radial cross section with one of the side walls of the channel diverging outwardly from the other, the open sides of the channel members being directed radially outwardly and the back portions being disposed closely adjacent a central plane between the rows of balls; wedge-shaped securing elements positioned between the balls and abutting the back walls of the channel-shaped members and the diverging side walls thereof, said elements being secured to the side walls of the channel-shaped members and being provided with axially directed extensions, and retainer members secured to said extensions, said members forming with the channel-shaped members means for retaining the balls in spaced position.

HARRY N. PARSONS.